Feb. 13, 1968  C. ORR, JR., ET AL  3,368,407
PRESSURE GAUGE

Filed May 11, 1965  2 Sheets-Sheet 1

INVENTORS
Clyde Orr, Jr.
Warren P. Hendrix

BY Newton, Hopkins,
Jones & Ormsby

ATTORNEYS

United States Patent Office 3,368,407
Patented Feb. 13, 1968

3,368,407
PRESSURE GAUGE
Clyde Orr, Jr., Atlanta, and Warren P. Hendrix, Lawrenceville, Ga., assignors to Georgia Tech Research Institute, Atlanta, Ga., a corporation of Georgia
Filed May 11, 1965, Ser. No. 454,923
11 Claims. (Cl. 73—399)

ABSTRACT OF THE DISCLOSURE

What is disclosed herein is a gas pressure gauge for measuring gas pressure in low ranges such as 0.001–4 torr by using the relationship between the thermal conductivity of a gas and its pressure. Specifically, what is disclosed is a gas pressure gauge having a housing with a cavity in which a gas is received and in which a heat generating means is positioned for the transfer of heat through the gas to the housing and having a heating means for maintaining the housing at a substantially constant temperature by controlling the output of a transformer in series with a heater surrounding the housing.

---

This invention relates to pressure sensing instruments, and is more particularly concerned with a pressure sensing instrument to measure pressure in an extremely low pressure range.

In many instances it is desirable to measure pressure in extremely low pressure ranges with a high degree of accuracy. Such measurements have heretofore been possible only with elaborate laboratory equipment that is by no means portable.

Previous attempts have been made to provide a compact and portable pressure gauge to measure pressures in the very low ranges; but, the accuracy of the prior art instrument has been so poor that the instrument is of little value for most applications.

One of the primary applications in which gas pressure must be measured in an extremely low range is the measurement of surface area and/or pore volume in which gas must be adsorbed on various materials. Krypton is quite often used as the gas to be adsorbed on material for measurement of surface area, and krypton is normally adsorbed at a pressure in the range of 0.001–4 torr. It is therefore desirable to have some very accurate means for measuring pressure of a gas such as krypton in this range of 0.001–4 torr.

The apparatus of the present invention operates on the principle of detecting the thermal conductivity of the gas at the given pressure. Since thermal conductivity varies directly with the pressure of the gas, measurement of thermal conductivity will give an accurate indication of the pressure of the gas. The thermal conductivity is indicated by heating an element in the gas until thermal equilibrium is reached between the gas and the container for the gas and the temperature of the element is measured in terms of pressure.

In general terms, the apparatus of the present invention includes a probe having a housing, the temperature of the housing being accurately controlled. Within the housing, there is a thermistor that is heated. When there is thermal equilibrium between the heated thermistor within the housing and the housing itself, the electrical resistance of the thermistor approaches stabilization, and is balanced against known resistances in a bridge circuit. The value of the resistance of the stabilized thermistor is an indication of gas pressure since its value is determined by the thermal conductivity of the gas.

The apparatus of the present invention includes electrical circuitry by which the temperature of the housing is accurately controlled, and by which the power input to the thermistor within the housing is maintained constant. The entire apparatus is quite simple, and is sufficiently small and convenient to use that it can be easily transported for use in any location.

These and other features and advantages of the present invention will become apparent from consideration of the following specification when taken in conjunction with the accompanying drawings in which.

Figure 1:
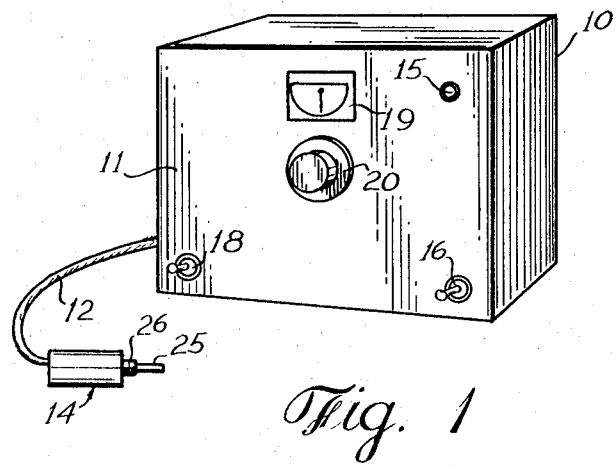
FIG. 1 is a perspective view of a pressure sensing apparatus made in accordance with the present invention.

Referring now more particularly to the drawings, and to that embodiment of the invention here chosen by way of illustration, the device shown in FIG. 1 includes a casing 10 having a face plate 11. From the casing 10 there extends a cord 12 which leads to the probe generally designated at 14.

The face 11 of the casing 10 includes a pilot light 15 which indicates when the device is turned on, and has another function which will be discussed later. There is an on-off switch 16 and a sensitivity selector switch 18. The meter 19 is a galvanometer to indicate the null point; and, the dial 20 controls a variable resistor to achieve the null point on the meter 19.

Figure 2:
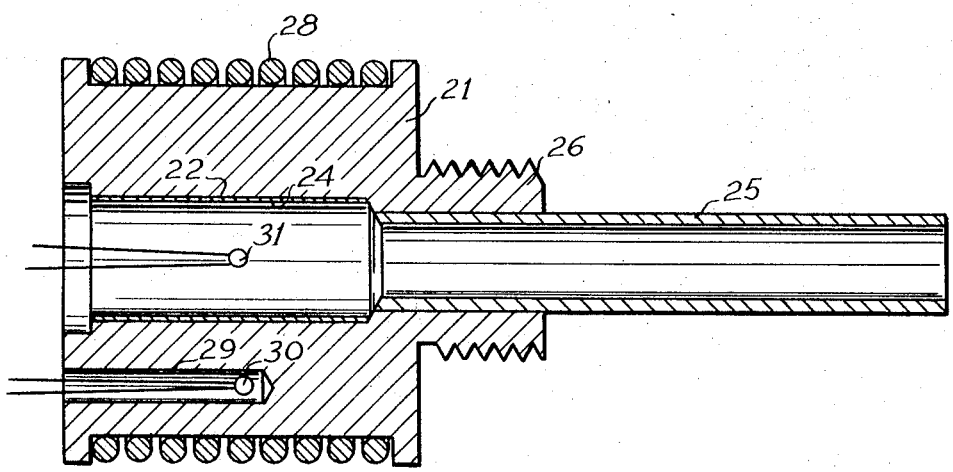
FIG. 2 is a longitudinal cross-sectional view of the probe shown in FIG. 1, the covering of the probe being removed; and, FIG. 3 is a schematic diagram of the circuit to be used in the apparatus shown in FIG. 1.

Referring to FIG. 2 of the drawings for a detailed discussion of the probe 14, it will be seen that there is a housing 21 having a central bore 22. The bore 22 has a tubular liner 24, the purpose of which is to provide a polished, shiny surface.

Although the polished surface may be provided in numerous ways, a successful commercial embodiment is prepared by inserting a stainless steel tube into the bore 22, the tube having a wall thickness of about .010 inch, and reaming the tube until a wall thickness of about .005 inch is achieved. The interior surface of the tube is then polished.

It will be seen that, extending from the central bore 22, and co-axial therewith, there is a tube 25. The tube 25 may be supported in any conventional manner, and is here shown as held within an externally threaded extension 26 of the housing 21.

Surrounding the housing 21, there is a heating coil 28 to heat the housing 21, as will be discussed later.

There is a hole 29 in the housing 21, the hole 29 being offset from the center of the housing so that it does not interfere with the central bore 22. Within the hole 29 there is a thermistor 30, the thermistor 30 being to detect the temperature of the housing 21. Within the central bore 22 there is a thermistor 31, this being the heated element that is to be placed in thermal equilibrium with the housing.

A general understanding of the invention is now possible. The tube 25 is connected to the source of gas, so that the gas under pressure is admitted into the central bore 22, within the tube 24. The heating element 28 is energized to maintain the housing 21 at a predetermined temperature, the temperature being sensed and controlled by the thermistor 30; and, the thermistor 31 is heated. The heat loss from the thermistor 31 becomes constant when the thermistor 31 is in thermal equilibrium with the housing 21. Except for the heat conducted along the leads of the thermistor 31, and the heat radiated to the walls of the housing 21 (more specifically, to the liner 24) the heat lost from the thermistor 31 is that heat conducted through the gas within the tube 24 to the housing. When the heat loss becomes constant, the electrical resistance of the thermistor becomes substantially stable; and, the value at which the resistance of the thermistor will be stabilized will be that value associated with the temperature of the thermistor resulting from the substantially constant heat loss.

Thus, the electrical resistance of the thermistor is a function of the thermal conductivity of the gas within the tube 24; therefore, measurement of the resistance of the thermistor 31 will indicate the thermal conductivity of the gas within the tube 24. The polished, shiny surface of the tube 24 will keep the loss of heat through radiation to a minimum and the very small leads to the thermistor 31 keeps the heat conducted away along these leads from the thermistor to a minimum. These two losses are constant, and are allowed for by calibration.

Figure 3:
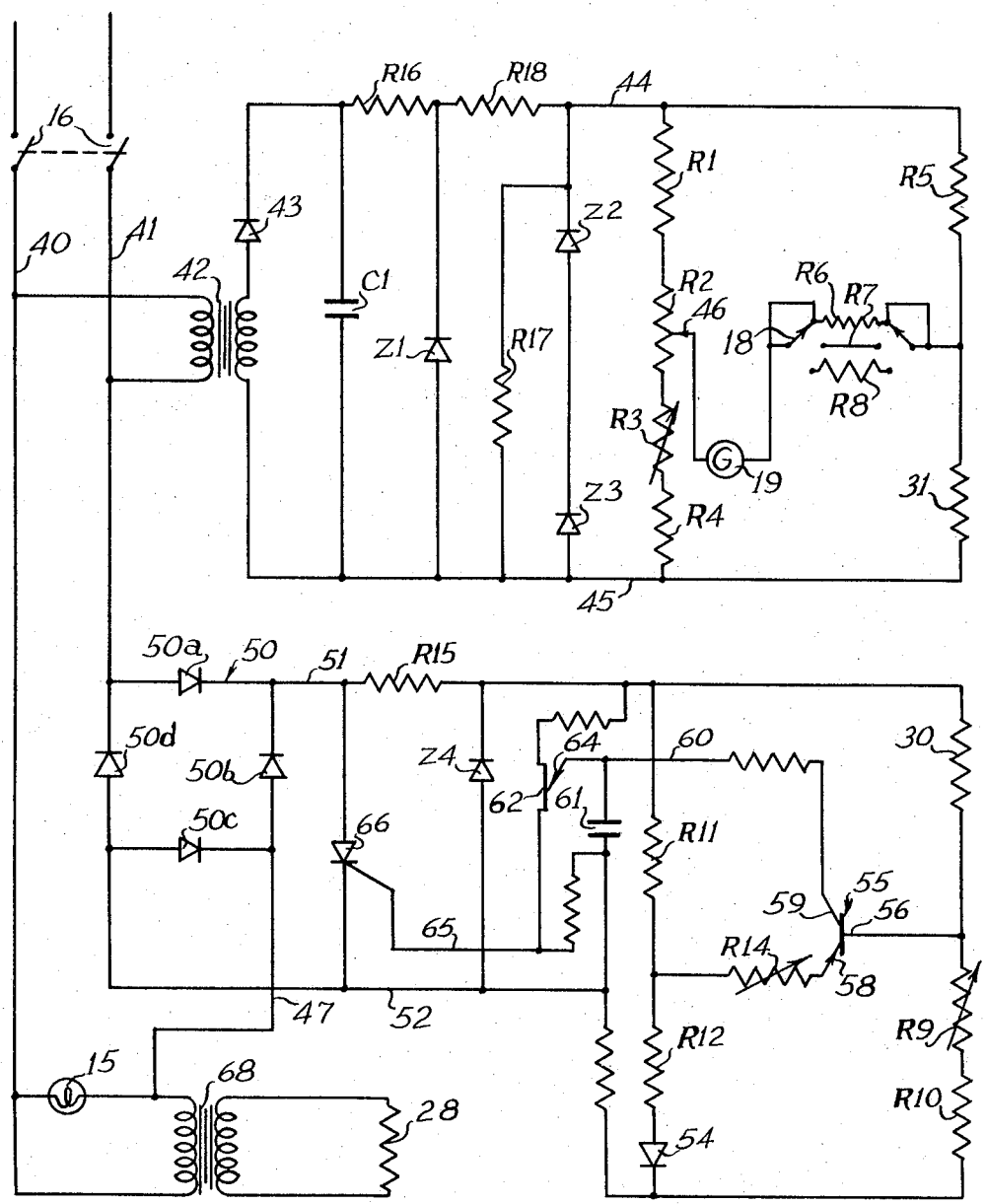

Attention is now directed to FIG. 3 of the drawings which shows a schematic diagram of the circuit for the present invention. The lines 40 and 41 lead to some convenient source of power, and the switch 16 is a double pole, single throw, on-off switch. There is a transformer 42, the primary winding of which is connected across the lines 40 and 41; and, the secondary winding provides the power for the heated thermistor 31.

Since the thermistor 31 is one element in a Wheatstone bridge, the current supply to the bridge must be direct current; therefore, the secondary winding of the transformer 42 is connected to a rectifying system.

The rectifying system includes a diode 43 in series with the secondary winding of the transformer 42; and, in parallel with the secondary winding and the diode 43 there is a capacitor C1. Thus, the diode 43 will provide half-wave rectification of the current from the transformer 42, and the capacitor C1 will smooth out the pulsating current to some extent.

It is necessary that the voltage on the Wheatstone bridge be constant. To achieve this, diodes are used, the diodes being p-n junction diodes with a reverse bias, commonly known as Zener diodes. These Zener diodes are operated within the voltage range in which they act as conductors, the conductance varying greatly with a small variation in the applied voltage.

As here used, there is a Zener diode Z1 connected in parallel between the two lines 44 and 45, with a resistor R16 to provide the proper voltage across the diode Z1. In normal operation, the voltage across the diode Z1 is in the voltage range that causes the diode to be a conductor. If the voltage increases by a small amount, the conductivity of the diode will be raised significantly, causing a greater voltage drop due to increased current to lower the voltage across the lines 44 and 45. Conversely, if the voltage across the diode Z1 decreases by a small amount, the conductivity of the diode will be lowered significantly, causing a smaller voltage drop due to decreased current to raise the voltage across the lines 44 and 45. Therefore, the diode Z1 will cause a change in the voltage drop to compensate for both a higher voltage and a lower voltage, to maintain a constant voltage on the lines 44 and 45.

To assure more nearly exact voltage, there are two more Zener diodes Z2 and Z3 which are connected in series, the series circuit being connected in parallel with the diode Z1. A resistor R18 in conjunction with a resistor R17 gives the proper voltage characteristics for the diodes Z2 and Z3. There are two diodes used rather than one in order to get greater temperature stability. Zener diodes in the range of 4 or 5 volts are very stable with temperature, whereas the stability falls off at higher and lower voltages. The diodes Z2 and Z3, in one commercial embodiment of the invention, are rated at 4.7 volts. This diode is much more stable than the 9.4 volts that would be required if only a single diode were used.

It will thus be seen that the Zener diode Z1 will provide some protection against voltage changes, and the Zener diodes Z2 and Z3 will provide very great protection against voltage changes, assuring that the voltage that is applied to the bridge will be constant.

The Wheatstone bridge is connected between the lines 44 and 45 which are the lines for the DC output of the rectifier. The bridge includes resistors R1, variable resistor R2, variable resistor R3, and resistor R4 which are all connected in series between the lines 44 and 45. Also connected between the lines 44 and 45, and in parallel with the resistors R1–R4 is the resistor R5 which is connected in series with the thermistor 31, here represented as a resistor. The movable contact 46 of the variable resistor R2 is connected to a galvanometer 19; and, the opposite side of the galvanometer 19 is connected to the switch 18. It should be observed that the switch 18 is here shown as a double pole, triple throw switch with three different resistors connected between the three throws, one resistor in each of the three positions of the switch. The three resistors R6, R7 and R8 are of three different values so that, as the switch 18 is shifted to different positions, a different amount of resistance will be in the galvanometer circuit to vary the sensitivity of the bridge.

It should be realized that the variable resistor R2 is the resistor controlled by the dial 20. With this in mind, it will be seen that, when the Wheatstone bridge is energized, current will flow through the resistor R5 and the thermistor 31 to heat the thermistor 31. As the thermistor 31 is heated, the resistance thereof will change, causing an imbalance of the bridge. As the imbalance is shown by the galvanometer 19, the contact 46 will be moved along the resistor R2 to bring the bridge back to balance. When the thermistor 31 has reached its final temperature, the position of the contact 46 on the resistor R2 will be read from the dial 20 in torrs of pressure. It will thus be realized that the actual reading will be considered as reflecting the temperature of the thermistor 31 and the pressure of the gas within the housing 21 of the probe 14.

To provide accurate data from the heat transfer, the temperature of the housing 21 of the probe 14 should be accurately controlled. To control this temperature, the thermistor 30 is one element of a Wheatstone bridge, and is so arranged that an imbalance in the bridge representing a low temperature will increase the energy to the heating coil 28 that surrounds the housing of the probe 14.

In more detail, there is a full wave rectifier 50 having diodes 50a, 50b, 50c and 50d. The connection between the diodes 50a and 50d is connected to the line 41; and, the connection between the diodes 50b and 50c is connected to the line wire 40 through the pilot lamp 15 and through the primary winding of the transformer 68 by the wire 47. It will thus be seen that the direct current output of the full wave rectifier 50 is on the wires 51 and 52.

Across these wires 51 and 52, there is the Wheatstone bridge which includes, in one leg, the thermistor 30 which is here shown as a resistor, and a variable resistor R9 in series with a fixed resistor R10. The other leg of the Wheatstone bridge includes a resistor R11 in series with a resistor R12, the resistors R11 and R12 being connected in series with a diode 54.

Instead of the usual galvanometer in the Wheatstone bridge, there is here shown a transistor 55 having the base 56 connected to the line between the thermistor 30 and the resistor R9, and the emitter 58 connected to the wire between the resistors R11 and R12 through a variable resistor R14.

It will thus be seen that, when there is an imbalance in the bridge due to the high resistance of the thermistor 30, a negative potential on the base 56 of the transistor 55 will cause an amplified current to flow from the emitter 58 to the collector 59; and, the collector 59 is connected through a wire 60 to one side of a capacitor 61. The opposite side of the capacitor 61 is connected to the wire 52; so, when there is a certain imbalance in the bridge, current will flow through the wire 60 to charge the capacitor 61. The capacitor 61 is in parallel with a transistor 62, the transistor 62 being a unijunction transistor so that, when a sufficiently high voltage is impressed on the emitter 64, current will flow to discharge the capacitor 61 and place a voltage on the wire 65. The wire 65 is connected to a silicon control rectifier 66; therefore, when the proper voltage is placed on the wire 65, the rectifier 66 will be fired to place a direct short across the rectifier 50.

It will be seen that, when the rectifier 50 is shorted, current will flow from the wire 41, through the diode 50a, through the silicon control rectifier 66 to the wire 52, and through the diode 50c and wire 47 to one side of the primary winding of the transformer 68. Since the other side of the primary winding of the transformer 68 is connected directly to the line 40, there will be a pulsating direct current on the primary winding of the transformer 68 which will induce a voltage in the secondary winding of the transformer 68 to energize the heater 28.

There is a Zener diode Z4 connected across the output terminals of the full wave rectifier 50. The diode acts very much like the Zener diodes described in connection with the power supply described above in that the diode Z4 is operated in the range in which it acts as a conductor; and, when the voltage across the diode varies slightly, the current varies considerably to cause a change in the voltage drop across the resistor R15 sufficient to establish the desired voltage.

In order to give the required loading for the Zener diode Z4, the lamp 15 is connected into the circuit. It will be seen that current can flow from the wire 41, through the diode 50a and to the wire 51, then through the diode Z4 to the wire 52, through the diode 50c to the wire 47, and through the lamp 15 to the wire 40. In the present embodiment a 10 watt lamp is satisfactory, and provides both loading for the diode Z4 and a pilot lamp for the device.

From the foregoing description, an understanding of the operation should be possible. First, the switch 16 is turned to the *on* position to energize the lines 40 and 41. This will immediately energize the transformer 42 to place a voltage across the secondary winding of the transformer 42. The diode 43 will provide a half-wave rectification for the alternating current from the transformer 42; and, the direct current will charge the capacitor C1, and will simultaneously place a voltage across the lines 44 and 45. Any small change in the voltage across the Zener diodes will cause a large change in the current through the circuit to adjust the voltage drop in the circuit as described above.

The sensitivity selector switch 18 would first be placed in position to put resistor R6 in the galvanometer circuit, and the dial 20 will be moved to move the movable contact 46 along the resistor R2 until the galvanometer 19 shows the null position. As the thermistor 31 changes in resistance, the galvanometer 19 will show a current passing through the galvanometer circuit, and the resistor R2 will again be adjusted to cause the galvanometer 19 to show the null position.

After the galvanometer 48 reads a consistent null position, the sensitivity selector switch 18 will be moved so that the resistor R8 is in the galvanometer circuit. Since resistor R8 is of less resistance than the resistor R6, the galvanometer circuit will be more responsive to changes in the resistance of the thermistor 31, so the bridge will be more sensitive. The galvanometer will again be adjusted to the null position, and the sensitivity selector switch 18 will again be moved to place the resistor R7 in the galvanometer circuit. Then the procedure will be repeated.

When the switch 16 is turned to the *on* position, the full wave rectifier 50 will be also energized through the pilot light 15 and the primary winding of the transformer 68 so that the pilot light 15 will be lighted. Energization of the full wave rectifier 50 will energize the Wheatstone bridge; and, assuming the thermistor 30 indicates that the housing 21 is at a low temperature (which it will when the device is first turned on), there will be a negative bias placed on the base 56 of the transistor 55. Current will therefore flow from the emitter 57 to the collector 59, thence to the wire 60 to charge the capacitor 61. When the voltage on the capacitor 61 reaches a predetermined level, the transistor 62 will be fired to place the proper potential on the wire 65 which leads to the silicon control rectifier 66. When the silicon control rectifier 66 is fired, there will be a circuit from the wire 41, through the diode 50a, through the silicon control rectifier 66, through the wire 52, through the diode 50c and wire 47 and to the primary winding of the transformer 68. Since the other side of the primary winding of the transformer 68 is connected directly to the line 40, the transformer 68 will be energized to induce a voltage in the secondary winding of the transformer 68 and energize the heater 28 to heat the housing 21 of the probe 14.

As the thermistor 30 approaches the resistance necessary to balance the bridge, the negative bias on the base 56 will become less; and, as the thermistor 30 gets further from the resistance necessary to balance the bridge, the negative bias on the base 56 will become greater. The negative bias on the base 56 of the transistor 55 is reflected in a larger or smaller current flow through the emitter-collector circuit; therefore, if there is a large negative bias on the base 56, a large current will flow through the emitter-collector circuit to charge the capacitor 61 rapidly, and if there is but a small negative bias on the base 56, there will be a small current flow to charge the capacitor 61 slowly.

This now gives a time variation in the firing of the unijunction transistor 62, since the transistor 62 is fired when the capacitor 61 is sufficiently charged. The elements in the circuit are so selected that a small portion of each pulse of the pulsating direct current can charge the capacitor 61 sufficiently to fire the transistor 62; as a result, a portion of each pulse can be passed through the transformer 68. If the transistor 62 is fired in the first part of a pulse, the circuit to the transformer will be completed to allow a large portion of the pulse to pass through the transformer 68 to give a large amount of heating. If the transistor 62 is fired in the last part of the pulse, only a small part of the pulse can pass through the transformer 68, and will give only a small amount of heating. Since the time of firing is dependent on the charging of the capacitor 61, and the charging of the capacitor 61 is dependent on the current flow through the emitter-collector circuit of the transistor 55, it will be seen that the time of firing is dependent on the resistance of the thermistor 30.

It will thus be understood that a portion of every pulse of the pulsating direct current will pass through the transformer 68. When more heat is required, a larger portion of the pulse will be used; and, when less heat is required, a smaller portion of the pulse will be used. In view of the frequency of the pulses, the effect is that the current to the transformer, hence to the heating coil 28, is simply increased or decreased according to demand.

It will be realized that, as long as there is heat flowing from the thermistor 31 at a greater rate than the rate at which the thermistor 31 is being heated, the thermistor 31 will be at too low a temperature, which means it will have too high a resistance to balance the Wheatstone bridge in which the thermistor 31 is connected. This means that there will be a current in the circuit to cause the galvanometer 19 to show deflection. When the heat flow is stabilized so that the heat flow from the thermistor 31 is equal to the heating of the thermistor 31, the thermistor 31 will be at the proper temperature to give it the proper resistance to balance the Wheatstone bridge so that the galvanometer 19 will indicate the null point.

It will thus be seen that the apparatus of the present invention provides a highly accurate, yet compact and portable means for measuring pressures in the ranges such as pressures of krypton in the range of 0.001–4 torr. The apparatus of the present invention should be standardized against a standard, such as a standardized, conventional McLeod gauge having a proper cold trap. Since the apparatus will have to be standardized with one gas, a conversion table is provided for ready translation to other gasses. A partial table for some gasses is as follows:

| Krypton | Argon | Helium | Oxygen |
|---|---|---|---|
| 0 | 0 | 0 | 0 |
| 0.2 | 0.12 | 0.10 | 0.10 |
| 0.5 | 0.38 | 0.27 | 0.25 |
| 1.0 | 0.52 | 0.40 | 0.35 |
| 1.5 | 0.63 | 0.47 | 0.41 |
| 2.0 | 0.70 | 0.52 | 0.45 |
| 2.5 | 0.76 | 0.57 | 0.49 |
| 3.0 | 0.81 | 0.62 | 0.52 |
| 3.5 | 0.86 | 0.66 | 0.55 |
| 4.0 | 0.90 | 0.69 | 0.58 |
| 5.0 | 0.97 | 0.74 | 0.62 |

| Carbon Dioxide | Air | Hydrogen |
|---|---|---|
| 0 | 0 | 0 |
| 0.09 | 0.08 | 0.07 |
| 0.20 | 0.19 | 0.17 |
| 0.30 | 0.26 | 0.23 |
| 0.36 | 0.31 | 0.29 |
| 0.40 | 0.35 | 0.30 |
| 0.44 | 0.38 | 0.33 |
| 0.47 | 0.41 | 0.36 |
| 0.50 | 0.44 | 0.38 |
| 0.53 | 0.47 | 0.40 |
| 0.57 | 0.51 | 0.43 |

It will of course be understood that the table is not exhaustive, and other gasses as well as other pressures could be computed.

It will be understood by those skilled in the art that the particular apparatus here shown by way of illustration is meant to be in no way restrictive; therefore, numerous changes and modifications may be made, and the full use of equivalents resorted to, without departing from the spirit or scope of the invention as defined by the appended claims.

We claim:

1. A pressure gauge for measuring the pressure of a gas including: a housing having a central bore therein, the internal surface of said bore being highly heat reflective; a tube for conducting gas into said bore; a first thermistor within said bore; a Wheatstone bridge having a first leg including said first thermistor and having second, third and fourth legs, a galvanometer circuit between the junction of said first leg and said second leg and the junction of said third leg and said fourth leg, means for varying the resistance of said third and fourth legs, and a plurality of resistors, each of said plurality of resistors having a different value, each of said plurality of resistors being selectively includable in said galvanometer circuit; a second thermistor embedded within said housing; a second Wheatstone bridge having a first leg including said second thermistor and having second, third and fourth legs, circuit means connected between the junction of said first and said second leg and the junction of said third leg and said fourth leg, said circuit means including amplifying means arranged so that a particular imbalance of said second bridge will be amplified by said amplifying means; a capacitor chargeable by said amplifying means; first switch means closed when said capacitor is charged to a predetermined amount; second switch means closed on closing of said first switch means; a heating means for heating said housing, said heating means being activated when said second switch means is closed; and means for indicating the resistance of said third and fourth legs of said first Wheatstone bridge in terms of the gas pressure related to the heat conducted from said first thermistor to said housing.

2. In a gas pressure gauge for measuring the pressure of a gas in a cavity in a housing, temperature responsive means imbedded in said housing for providing a variable output in response to the temperature of said housing, heating means responsive to said variable output for heating said housing so as to maintain said housing at a substantially constant temperature, heat generating means positioned within said cavity for selectively generating heat, and indicating means responsive to said heat generating means for indicating when heat generated by said heat generating means is substantially equal to heat absorbed by said housing.

3. The pressure gauge of claim 2 in which said temperature responsive means includes a thermistor having a resistance which varies with its temperature and in which said heating means includes a heater surrounding said housing and operatively connected to said thermistor.

4. The gas pressure gauge of claim 3 in which said heating means includes a transformer having a primary winding and a secondary winding in series with said heater, and circuit means including said primary winding and means for varying current flow through said primary winding in response to change in said resistance of said thermistor.

5. The gas pressure gauge of claim 4 in which said circuit means includes a transistor operatively connected to said thermistor so that current through said transistor is responsive to said resistance of said thermistor, and current control means for varying current through said primary winding of said transformer in response to current through said transistor.

6. The gas pressure gauge of claim 5 in which said current control means includes a capacitor for accumulating current through said transistor, a second transistor responsive to voltage across said capacitor, and switch means responsive to said second transistor and in series with said primary winding.

7. The gas pressure gauge of claim 2 in which said temperature responsive means is a thermistor and in which said heating means includes a heating device adjacent said housing, a Wheatstone bridge with said thermistor in one leg, detecting means for determining when said Wheatstone bridge is out of balance, and means for causing said detecting means to actuate said heating device.

8. The gas pressure gauge of claim 2 in which said temperature responsive means is a thermistor and in which said heating means includes a heating device adjacent said housing, a Wheatstone bridge including a first leg having said thermistor therein, a second leg, a third leg and a fourth leg, circuit means connected between said first leg and said second leg of said Wheatstone bridge, the other side of said circuit means being connected between said third leg and said fourth leg of said Wheatstone bridge, said circuit means including amplifying means for amplifying an inbalance of said Wheatstone bridge, a capacitor, said amplifying means being arranged to charge said capacitor, a first switch means operatively closed when said capacitor has a predetermined charge thereon, and a second switch means closed upon closing of said first switch means and being arranged to energize said heating device.

9. The gas pressure gauge of claim 2 in which said heat generating means is a thermistor operatively connected to a power supply which includes rectifying means for rectifying an alternating voltage to provide a direct voltage, circuit means, conducting means in said circuit means for causing a current to flow in said circuit means, said conducting means being such that a small change in direct voltage will cause a large change in the current in said circuit means.

10. The gas pressure gauge of claim 2 in which said heat generating means is a thermistor operatively connected to a power supply which includes rectifying means for rectifying an alternating voltage to provide a direct voltage, circuit means, conducting means in said circuit means for causing a current to flow in said circuit means, resistance means in said circuit means for causing a voltage drop in said circuit means, said conducting means being such that a small change in said direct voltage will cause a large change in the current in said circuit means and a large change in the voltage drop across said resistance means.

11. The device as claimed in claim 10, said conducting means being a Zener diode.

References Cited

UNITED STATES PATENTS 3,282,097   11/1966   Schmid et al. _____ 73—170

OTHER REFERENCES

Suchet: Measures, April 1953, No. 191, pages 205–209.

Varicak et al.: The Review of Scientific Instruments, vol. 3D, No. 10, October 1959, pages 891–895.

Atkins et al.: Instrument Practice, vol. 13, No. 10, October 1959, pages 1042–1046.

Publication by Numinco entitled "Thermistor Gauge Model MIC–401," received December 1963, 3 pages and 1 photo.

Publication by Numinco entitled "Thermistor Pressure Gauge Model MIC–401," November 1964, 6 pages.

LOUIS R. PRINCE, *Primary Examiner.*

DONALD O. WOODIEL, *Examiner.*